(12) United States Patent
Lam et al.

(10) Patent No.: US 7,749,562 B1
(45) Date of Patent: Jul. 6, 2010

(54) POROUS FRICTION MATERIAL COMPRISING NANOPARTICLES OF FRICTION MODIFYING MATERIAL

(75) Inventors: Robert C. Lam, Rochester, MI (US); Yih-Fang Chen, Lisle, IL (US); Kenji Maruo, Fukuroi Shizuoka (JP)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 12/157,901

(22) Filed: Jun. 12, 2008

Related U.S. Application Data (62) Division of application No. 10/899,508, filed on Jul. 26, 2004, now Pat. No. 7,429,418.

(51) Int. Cl.
*B05D 1/12* (2006.01)

(52) U.S. Cl. .................. 427/201; 427/180; 427/243

(58) Field of Classification Search .............. 427/180, 427/201, 243
See application file for complete search history.

(56) References Cited

U.S. PATENT DOCUMENTS

| | | | |
|---|---|---|---|
| 1,039,168 A | 9/1912 | Melton |
| 1,682,198 A | 8/1928 | Sitton |
| 1,860,147 A | 5/1932 | Hadley |
| 2,100,347 A | 11/1937 | Nanfeldt |
| 2,182,208 A | 12/1939 | Nason |
| 2,221,893 A | 11/1940 | White |
| 2,307,814 A | 1/1943 | Walters |
| 2,316,874 A | 4/1943 | Kraft |
| 2,354,526 A | 7/1944 | Lapsley et al. |
| 2,516,544 A | 7/1950 | Breeze |
| 2,555,261 A | 5/1951 | Walters |
| 2,702,770 A | 2/1955 | Steck |
| 2,749,264 A | 6/1956 | Emrick |
| 2,779,668 A | 1/1957 | Daniels |
| 3,020,139 A | 2/1962 | Camp et al. |
| 3,080,028 A | 3/1963 | Kennedy |
| 3,215,648 A | 11/1965 | Duffy |
| 3,270,846 A | 9/1966 | Arledter et al. |
| 3,429,766 A | 2/1969 | Stormfeltz |
| 3,520,390 A | 7/1970 | Bentz |
| 3,526,306 A | 9/1970 | Bentz |
| 3,578,122 A | 5/1971 | Magnier |

(Continued)

FOREIGN PATENT DOCUMENTS

CH 312771 (A) 2/1956

(Continued)

OTHER PUBLICATIONS

Application No. EP01309199 Search Report, completed Feb. 15, 2002.

(Continued)

*Primary Examiner*—Frederick J Parker
(74) *Attorney, Agent, or Firm*—Reising Ethington P.C.

(57) ABSTRACT

A method of making a friction material which includes a porous base material, at least one type of resin material, and at least one type of nanoparticle-sized friction modifying particle, is disclosed. The resin material and the nanoparticle-sized friction modifying particles are substantially uniformly dispensed throughout the base material.

14 Claims, 3 Drawing Sheets

U.S. PATENT DOCUMENTS

| | | |
|---|---|---|
| 3,654,777 A | 4/1972 | Grundman |
| 3,746,669 A | 7/1973 | Dunnom |
| 3,871,934 A | 3/1975 | Mann |
| 3,885,006 A | 5/1975 | Hatch et al. |
| 3,899,050 A | 8/1975 | Savary et al. |
| 3,911,045 A | 10/1975 | Hartmann et al. |
| 3,927,241 A | 12/1975 | Augustin |
| 3,944,686 A | 3/1976 | Froberg |
| 3,950,047 A | 4/1976 | Capelli |
| 3,980,729 A | 9/1976 | Yokokawa et al. |
| 4,002,225 A | 1/1977 | Marin |
| 4,020,226 A | 4/1977 | Andrianov et al. |
| 4,033,437 A | 7/1977 | Labat |
| 4,045,608 A | 8/1977 | Todd |
| 4,051,097 A | 9/1977 | Aldrich |
| 4,084,863 A | 4/1978 | Capelli |
| 4,098,630 A | 7/1978 | Morse |
| 4,113,894 A | 9/1978 | Koch, II |
| 4,150,188 A | 4/1979 | Brulet |
| 4,197,223 A | 4/1980 | Bartram |
| 4,209,086 A | 6/1980 | Friedrich |
| 4,226,906 A | 10/1980 | Jacob |
| 4,239,666 A | 12/1980 | Jacko et al. |
| 4,256,801 A | 3/1981 | Chuluda |
| 4,259,397 A | 3/1981 | Saito et al. |
| 4,260,047 A | 4/1981 | Nels |
| 4,267,912 A | 5/1981 | Bauer et al. |
| 4,291,794 A | 9/1981 | Bauer |
| 4,320,823 A | 3/1982 | Covaleski |
| 4,324,706 A | 4/1982 | Tabe et al. |
| 4,352,750 A | 10/1982 | Eschen |
| 4,373,038 A | 2/1983 | Moraw et al. |
| 4,374,211 A | 2/1983 | Gallagher et al. |
| 4,396,100 A | 8/1983 | Eltze |
| 4,444,574 A | 4/1984 | Tradewell et al. |
| 4,451,590 A | 5/1984 | Fujimaki et al. |
| 4,453,106 A | 6/1984 | La Fiandra |
| 4,456,650 A | 6/1984 | Melotik et al. |
| 4,457,967 A | 7/1984 | Chareire et al. |
| 4,490,432 A | 12/1984 | Jordan |
| 4,514,541 A | 4/1985 | Frances |
| 4,522,290 A | 6/1985 | Klink |
| 4,524,169 A | 6/1985 | Wolff et al. |
| 4,543,106 A | 9/1985 | Parekh |
| 4,563,386 A | 1/1986 | Schwartz |
| 4,593,802 A | 6/1986 | Danko, Jr. |
| 4,628,001 A | 12/1986 | Sasaki et al. |
| 4,639,392 A | 1/1987 | Nels et al. |
| 4,646,900 A | 3/1987 | Crawford et al. |
| 4,656,203 A | 4/1987 | Parker |
| 4,657,951 A | 4/1987 | Takarada et al. |
| 4,663,230 A | 5/1987 | Tennent |
| 4,663,368 A | 5/1987 | Harding et al. |
| 4,672,082 A | 6/1987 | Nakagawa et al. |
| 4,674,616 A | 6/1987 | Mannino, Jr. |
| 4,694,937 A | 9/1987 | Jonas |
| 4,698,889 A | 10/1987 | Patzer et al. |
| 4,700,823 A | 10/1987 | Winckler |
| 4,726,455 A | 2/1988 | East |
| 4,732,247 A | 3/1988 | Frost |
| 4,742,723 A | 5/1988 | Lanzerath et al. |
| 4,743,634 A | 5/1988 | Royer |
| 4,770,283 A | 9/1988 | Putz et al. |
| 4,772,508 A | 9/1988 | Brassell |
| 4,792,361 A | 12/1988 | Double et al. |
| 4,861,809 A | 8/1989 | Ogawa et al. |
| 4,878,282 A | 11/1989 | Bauer |
| 4,913,267 A | 4/1990 | Campbell et al. |
| 4,915,856 A | 4/1990 | Jamison |
| 4,917,743 A | 4/1990 | Gramberger et al. |
| 4,918,116 A | 4/1990 | Gardziella et al. |
| 4,927,431 A | 5/1990 | Buchanan et al. |
| 4,950,530 A | 8/1990 | Shibatani |
| 4,951,798 A | 8/1990 | Knoess |
| 4,983,457 A | 1/1991 | Hino et al. |
| 4,986,397 A | 1/1991 | Vierk |
| 4,995,500 A | 2/1991 | Payvar |
| 4,997,067 A | 3/1991 | Watts |
| 5,004,497 A | 4/1991 | Shibata et al. |
| 5,017,268 A | 5/1991 | Clitherow et al. |
| 5,033,596 A | 7/1991 | Genise |
| 5,038,628 A | 8/1991 | Kayama |
| 5,076,882 A | 12/1991 | Oyanagi et al. |
| 5,080,969 A | 1/1992 | Tokumura |
| 5,083,650 A | 1/1992 | Seiz et al. |
| 5,093,388 A | 3/1992 | Siemon, Jr. et al. |
| 5,094,331 A | 3/1992 | Fujimoto et al. |
| 5,101,953 A | 4/1992 | Payvar |
| 5,105,522 A | 4/1992 | Gramberger et al. |
| 5,143,192 A | 9/1992 | Vojacek et al. |
| 5,164,256 A | 11/1992 | Sato et al. |
| 5,211,068 A | 5/1993 | Spitale et al. |
| 5,221,401 A | 6/1993 | Genise |
| 5,233,736 A | 8/1993 | Hill |
| 5,259,947 A | 11/1993 | Kalback et al. |
| 5,266,395 A | 11/1993 | Yamashita et al. |
| 5,269,400 A | 12/1993 | Fogelberg |
| 5,290,627 A | 3/1994 | Ikuta |
| 5,313,793 A | 5/1994 | Kirkwood et al. |
| 5,332,075 A | 7/1994 | Quigley et al. |
| 5,335,765 A | 8/1994 | Takakura et al. |
| 5,354,603 A | 10/1994 | Errede et al. |
| 5,376,425 A | 12/1994 | Asano et al. |
| 5,395,864 A | 3/1995 | Miyoshi et al. |
| 5,396,552 A | 3/1995 | Jahn et al. |
| 5,437,780 A | 8/1995 | Southard et al. |
| 5,439,087 A | 8/1995 | Umezawa |
| 5,445,060 A | 8/1995 | Randall et al. |
| 5,453,317 A | 9/1995 | Yesnik |
| 5,460,255 A | 10/1995 | Quigley et al. |
| 5,472,995 A | 12/1995 | Kaminski et al. |
| 5,474,159 A | 12/1995 | Soennecken et al. |
| 5,478,642 A | 12/1995 | McCord |
| 5,501,788 A | 3/1996 | Romine et al. |
| 5,520,866 A | 5/1996 | Kaminski et al. |
| 5,529,666 A | 6/1996 | Yesnik |
| 5,540,621 A | 7/1996 | Keester et al. |
| 5,540,832 A | 7/1996 | Romino |
| 5,540,903 A | 7/1996 | Romine |
| 5,571,372 A | 11/1996 | Miyaishi et al. |
| 5,585,166 A | 12/1996 | Kearsey |
| 5,615,758 A | 4/1997 | Nels |
| 5,620,075 A | 4/1997 | Larsen et al. |
| 5,639,804 A | 6/1997 | Yesnik |
| 5,646,076 A | 7/1997 | Bortz |
| 5,648,041 A | 7/1997 | Rodgers et al. |
| 5,662,993 A | 9/1997 | Winckler |
| 5,670,231 A | 9/1997 | Ohya et al. |
| 5,671,835 A | 9/1997 | Tanaka et al. |
| 5,674,947 A | 10/1997 | Oishi et al. |
| 5,676,577 A | 10/1997 | Lam et al. |
| 5,705,120 A | 1/1998 | Ueno et al. |
| 5,707,905 A | 1/1998 | Lam et al. |
| 5,718,855 A | 2/1998 | Akahori et al. |
| 5,733,176 A | 3/1998 | Robinson et al. |
| 5,753,018 A | 5/1998 | Lamport et al. |
| 5,753,356 A | 5/1998 | Lam et al. |
| 5,766,523 A | 6/1998 | Rodgers et al. |
| 5,771,691 A | 6/1998 | Kirkwood et al. |
| 5,775,468 A | 7/1998 | Lam et al. |
| 5,776,288 A | 7/1998 | Stefanutti et al. |
| 5,777,791 A | 7/1998 | Hedblom |
| 5,792,544 A | 8/1998 | Klein |
| 5,803,210 A | 9/1998 | Kohno et al. |

| | | | | | | |
|---|---|---|---|---|---|---|
| 5,816,901 A | 10/1998 | Sirany | | 2003/0053735 A1 | 3/2003 | Vernooy |
| 5,827,610 A | 10/1998 | Ramachandran | | 2003/0134098 A1 | 7/2003 | Bauer et al. |
| 5,834,551 A | 11/1998 | Haraguchi et al. | | 2003/0154882 A1 | 8/2003 | Nagata et al. |
| 5,842,551 A | 12/1998 | Nels | | 2004/0006192 A1 | 1/2004 | Aiba et al. |
| 5,845,754 A | 12/1998 | Weilant | | 2004/0033341 A1* | 2/2004 | Lam et al. ............ 428/143 |
| 5,856,244 A | 1/1999 | Lam et al. | | 2004/0043193 A1 | 3/2004 | Chen et al. |
| 5,858,166 A | 1/1999 | James et al. | | 2004/0043243 A1 | 3/2004 | Chen et al. |
| 5,858,883 A | 1/1999 | Lam et al. | | 2004/0081795 A1 | 4/2004 | Wang et al. |
| 5,889,082 A | 3/1999 | Kaminski et al. | | 2004/0081813 A1 | 4/2004 | Dong |
| 5,895,716 A | 4/1999 | Fiala et al. | | 2004/0192534 A1 | 9/2004 | Nixon et al. |
| 5,897,737 A | 4/1999 | Quigley | | 2004/0198866 A1 | 10/2004 | Sasaki |
| 5,919,528 A | 7/1999 | Huijs et al. | | 2004/0224864 A1* | 11/2004 | Patterson et al. ............ 510/161 |
| 5,919,837 A | 7/1999 | Kaminski et al. | | 2005/0004258 A1 | 1/2005 | Yamamoto et al. |
| 5,952,249 A | 9/1999 | Gibson et al. | | 2005/0025967 A1 | 2/2005 | Lawton et al. |
| 5,958,507 A | 9/1999 | Lam et al. | | 2005/0039872 A1 | 2/2005 | Kimura et al. |
| 5,965,658 A | 10/1999 | Smith et al. | | 2005/0064778 A1 | 3/2005 | Lam et al. |
| 5,975,270 A | 11/1999 | Tokune et al. | | 2005/0074595 A1 | 4/2005 | Lam |
| 5,975,988 A | 11/1999 | Christianson | | 2005/0075019 A1 | 4/2005 | Lam et al. |
| 5,989,375 A | 11/1999 | Bortz | | 2005/0075021 A1 | 4/2005 | Lam et al. |
| 5,989,390 A | 11/1999 | Lee | | 2005/0075022 A1 | 4/2005 | Lam |
| 5,998,307 A | 12/1999 | Lam et al. | | 2005/0075413 A1 | 4/2005 | Lam |
| 5,998,311 A | 12/1999 | Nels | | 2005/0075414 A1 | 4/2005 | Lam et al. |
| 6,000,510 A | 12/1999 | Kirkwood et al. | | 2005/0191477 A1 | 9/2005 | Dong |
| 6,001,750 A | 12/1999 | Lam | | 2005/0271876 A1 | 12/2005 | Walker et al. |
| 6,019,205 A | 2/2000 | Willwerth et al. | | 2005/0281971 A1 | 12/2005 | Lam et al. |
| 6,042,935 A | 3/2000 | Krenkel et al. | | 2006/0008635 A1 | 1/2006 | Dong et al. |
| 6,060,536 A | 5/2000 | Matsumoto et al. | | 2006/0019085 A1 | 1/2006 | Lam et al. |
| 6,065,579 A | 5/2000 | Nels | | 2006/0062987 A1 | 3/2006 | Niewohner et al. |
| 6,074,950 A | 6/2000 | Wei | | 2006/0121263 A1 | 6/2006 | Komori et al. |
| 6,121,168 A | 9/2000 | Irifune et al. | | 2006/0151912 A1 | 7/2006 | Bauer |
| 6,123,829 A | 9/2000 | Zimmerman et al. | | 2006/0241207 A1 | 10/2006 | Lam et al. |
| 6,130,176 A | 10/2000 | Lam | | 2007/0011951 A1 | 1/2007 | Gaeta et al. |
| 6,132,877 A | 10/2000 | Winckler et al. | | 2007/0062777 A1 | 3/2007 | Zagrodzki et al. |
| 6,140,388 A | 10/2000 | Nass et al. | | 2007/0117881 A1 | 5/2007 | Watanabe et al. |
| 6,163,636 A | 12/2000 | Stentz et al. | | 2007/0205076 A1 | 9/2007 | Takahashi et al. |
| 6,182,804 B1 | 2/2001 | Lam | | | | |
| 6,194,059 B1 | 2/2001 | Yesnik | | FOREIGN PATENT DOCUMENTS | | |
| 6,217,413 B1 | 4/2001 | Christianson | | | | |
| 6,231,977 B1 | 5/2001 | Suzuki et al. | | CH | 1057662 (A) | 1/1992 |
| 6,265,066 B1 | 7/2001 | Suzuki et al. | | CN | 1500850 (A) | 6/2004 |
| 6,284,815 B1 | 9/2001 | Sasahara et al. | | DE | 2828918 (A1) | 1/1979 |
| 6,291,040 B1 | 9/2001 | Moriwaki et al. | | DE | 2854051 (A1) | 6/1979 |
| 6,315,974 B1 | 11/2001 | Murdie et al. | | DE | 2937471 A1 | 3/1980 |
| 6,316,086 B1 | 11/2001 | Beier et al. | | DE | 3532795 (A1) | 4/1986 |
| 6,323,160 B1 | 11/2001 | Murdie et al. | | DE | 3622437 A1 | 10/1987 |
| 6,352,758 B1 | 3/2002 | Huang et al. | | DE | 3705657 A1 | 9/1988 |
| 6,383,605 B1 | 5/2002 | Ejiri | | DE | 4211010 (A1) | 10/1992 |
| 6,387,531 B1 | 5/2002 | Bi et al. | | DE | 4302773 A1 | 8/1993 |
| 6,432,151 B1* | 8/2002 | So et al. ............ 51/308 | | DE | 19530443 A1 | 10/1996 |
| 6,432,187 B1 | 8/2002 | Ogawa et al. | | DE | 10114074 A1 | 9/2002 |
| 6,524,681 B1 | 2/2003 | Seitz et al. | | DE | 10157583 C1 | 12/2002 |
| 6,569,816 B2 | 5/2003 | Oohira et al. | | DE | 102008013907 (A1) | 9/2009 |
| 6,586,373 B2 | 7/2003 | Suzuki et al. | | EP | 0180381 A2 | 5/1986 |
| 6,601,321 B1 | 8/2003 | Kendall | | EP | 0202145 A1 | 11/1986 |
| 6,630,416 B1 | 10/2003 | Lam et al. | | EP | 0352363 B1 | 1/1988 |
| 6,638,883 B2 | 10/2003 | Gaffney et al. | | EP | 0264096 A2 | 4/1988 |
| 6,652,363 B2* | 11/2003 | Kramer et al. ............ 451/41 | | EP | 0393845 A1 | 10/1990 |
| 6,668,891 B2 | 12/2003 | Collis | | EP | 0510875 A2 | 10/1992 |
| 6,703,117 B2 | 3/2004 | Gruber et al. | | EP | 0521843 A1 | 1/1993 |
| 6,808,225 B2 | 10/2004 | Moriyama | | EP | 0554902 A1 | 8/1993 |
| 6,831,146 B2* | 12/2004 | Aiba et al. ............ 528/129 | | EP | 0557905 A1 | 9/1993 |
| 6,855,410 B2 | 2/2005 | Buckley | | EP | 0581696 A1 | 2/1994 |
| 6,875,711 B2 | 4/2005 | Chen et al. | | EP | 0637698 A1 | 2/1995 |
| 6,951,504 B2 | 10/2005 | Adefris et al. | | EP | 0640774 B1 | 3/1995 |
| 7,014,027 B2 | 3/2006 | Adair et al. | | EP | 0669482 A2 | 8/1995 |
| 7,160,913 B2 | 1/2007 | Schneider | | EP | 0965887 A1 | 2/1996 |
| 7,208,432 B1 | 4/2007 | Beier et al. | | EP | 0766019 A1 | 4/1997 |
| 7,294,388 B2 | 11/2007 | Lam et al. | | EP | 0807766 A1 | 11/1997 |
| 7,332,240 B2 | 2/2008 | O'Hara et al. | | EP | 0854305 A1 | 7/1998 |
| 7,429,418 B2 | 9/2008 | Lam et al. | | EP | 0971151 A1 | 1/2000 |
| 2002/0068164 A1 | 6/2002 | Martin | | EP | 1039168 A1 | 9/2000 |
| 2002/0164473 A1 | 11/2002 | Buckley | | EP | 1203897 A1 | 5/2002 |
| 2003/0050831 A1 | 3/2003 | Klayh | | EP | 1391629 A1 | 2/2004 |

| | | |
|---|---|---|
| EP | 1394438 A1 | 3/2004 |
| EP | 1396655 A1 | 3/2004 |
| EP | 1517062 A1 | 3/2005 |
| EP | 1521001 A2 | 4/2005 |
| EP | 1521007 A2 | 4/2005 |
| EP | 1614926 A1 | 1/2006 |
| EP | 1911990 A2 | 4/2008 |
| FR | 2430545 A1 | 2/1980 |
| GB | 1054890 | 1/1967 |
| GB | 1604827 | 12/1981 |
| GB | 2224285 A | 5/1990 |
| GB | 2241246 A | 8/1991 |
| JP | 55005907 A | 1/1980 |
| JP | 58180573 A | 10/1983 |
| JP | 59103040 A | 6/1984 |
| JP | 63066230 A | 3/1988 |
| JP | 63-152735 | 6/1988 |
| JP | 1134002 A | 5/1989 |
| JP | 1163056 A | 6/1989 |
| JP | 1307529 A | 12/1989 |
| JP | 2017223 A | 1/1990 |
| JP | 3281686 A | 12/1991 |
| JP | 5009458 A | 1/1993 |
| JP | 5247233 A | 9/1993 |
| JP | 5247447 A | 9/1993 |
| JP | 6240233 A | 8/1994 |
| JP | 6299434 A | 10/1994 |
| JP | 07-173301 | 7/1995 |
| JP | 07-151174 | 6/1996 |
| JP | 8210402 A | 8/1996 |
| JP | 09-176333 | 7/1997 |
| JP | 176667 A | 7/1997 |
| JP | 9324824 A | 12/1997 |
| JP | 10110740 A | 4/1998 |
| JP | 2000-091186 | 3/2000 |
| JP | 20000336343 | 12/2000 |
| JP | 2002005280 A | 1/2002 |
| JP | 2002005317 A | 1/2002 |
| JP | 2002234951 A | 8/2002 |
| JP | 2003003155 | 1/2003 |
| JP | 2004132547 A | 4/2004 |
| JP | 2004217790 A | 8/2004 |
| JP | 2004266087 A | 9/2004 |
| WO | WO95/26473 | 10/1995 |
| WO | WO96/10701 A1 | 4/1996 |
| WO | WO98/09093 A1 | 3/1998 |
| WO | WO99/35415 A1 | 7/1999 |
| WO | WO2005/102962 A1 | 11/2005 |
| WO | WO2006/101799 A2 | 9/2006 |
| WO | WO2006/116474 A2 | 11/2006 |
| WO | WO2007/055951 A1 | 5/2007 |

OTHER PUBLICATIONS

Application No. EP02257364 Search Report, completed Dec. 3, 2003.
Application No. EP03255504 Search Report, completed Dec. 4, 2003.
Application No. EP03256313 Search Report, completed Mar. 5, 2009.
Application No. EP04253746 Search Report, completed May 3, 2005.
Application No. EP04255582 Search Report, completed Jun. 15, 2007.
Application No. EP04255993 Search Report, completed Jun. 5, 2009.
Application No. EP05254284 Search Report, completed Nov. 2, 2005.
Application No. EP05253694 Search Report, completed Oct. 18, 2005.
Application No. EP05254474 Search Report, completed Oct. 21, 2005.
Application No. EP06758609 Search Report, completed May 6, 2008.
Application No. EP08012805 Search Report, completed Oct. 14, 2008.
Application No. EP96306350 Search Report, completed Dec. 4, 1996.
Application No. PCT/US06/15769 International Search Report and Written Opinion, International Filing Date Apr. 25, 2006.
Application No. PCT/US06/42342 International Search Report and Written Opinion, International Filing Date Oct. 31, 2006.
Application No. PCT/US07/07788 International Search Report and Written Opinion, International Filing Date Mar. 28, 2007.
Application No. PCT/US2008/073266 International Search Report, International Filing Date Aug. 15, 2008.
Application No. PCT/US2008/080617 International Search Report, International Filing Date Oct. 21, 2008.
Application No. PCT/US97-15260 International Search Report, completed Nov. 20, 1997.
ASTM D638-08 Standard Test Method for Tensile Properties of Plastics, Copyright 1996-2009, pp. 1-4 ASTM International, West Conshohocken, PA, US.
Tensile Property Testing of Plastics; MatWeb: Material Property Data, www.matweb.com/reference/tensilestrength.
Spiliadis, S., Garniture de freins a hautes performances contenant de la pulpe para-aramide Kevlar, 1141 Ingenieurs de L'Automobile, (1989) Decembre, No. 653, Courbevoie, FR.
Garshin et al., Structural Features of a Carbon Plastic Material Infiltrated with Molten Silicon; Regractories and Industrial Ceramics, pp. 419-22, 2005.
Ma et al., Effect of Infiltrating Si on Friction Properties of C/C Composites; J. Cent. South Univ. Technol. vol. 10, No. 3, Sep. 2003, pp. 173-176.
Joseph, Marjory, Introductory Tensile Science, pp. 164, Holt, Rinehart and Wilson, Fifth Edition, Copyright 1986.
Zhaoting Liu et al., Synthesis of ZnFe2O4/SiO2 cmposites derived from a diatomite template, Bioinspiration & Biomimetics, 2 (2007) pp. 30-35. 1999.
Anderson et al., Hierarchical Pore Structures through Diatom Zeolitization, Angew. Chem, Int. Ed. 2000, vol. 39, No. 15, pp. 2707-2710.
Yajun Wang et al., Zeolitization of diatomite to prepare hierarchical porous zeolite materials through a vapor-phase transport . . . , j. Mater. Chem, 2002, vol. 12, pp. 812-1818.
Blanco et al., Chemical and Physical properties of carbon as related to brake performance, Elsevier, Wear 213 (1997) pp. 1-12.
Carbon Fiber for Wet-Friction Transmissions, SAE Technical, Off-Highway Engineering/Feb. 1998, pp. 46-48.
Hettinger, Jr. et al., Carboflex and Aerocarb-Ashland's New Low Cost Carbon Fiber and Carbonizing Products for Future Break Applications, 860767, Copyright 1986, pp. 1-11.
Gibson et al., Carbon/Carbon Friction Materials for Dry and Wet Brake and Clutch Applications, SAE Technical Paper Series, 890950, Copyright 1989, pp. 1-6.
Cardolite Brochure, Cardolite Corporation, www.cardolite.com, edition Jun. 2004.
What is a TPE?, GLS Corporation, www.glscorporation.com/resources/faqs.php, coypright 2007.
Lam et al., Friction Material for Continuous Slip Torque Converter Applications: Anti-Shudder Considerations, 941031, pp. 1-11.
MPEP 1504.6 Double Patenting [R-5] - 25—Design Patents, United States Patent and Trademark Office, USPTO.gov, Last Modified: Dec. 5, 2006.
U.S. Appl. No. 12/185,236; Friction Material With Silicon, Feng Dong, Filed Aug. 4, 2008.
U.S. Appl. No. 12/084,514; Carbon Friction Materials, Feng Dong et al., Filed May 1, 2008.
U.S. Appl. No. 10/871,786; Fully Fibrous Structure Friction Material, Robert C. Lam, Filed Jun. 18, 2004.
U.S. Appl. No. 11/410,722, Friction Material, Robert C. Lam, Filed Apr. 25, 2006.
U.S. Appl. No.12/225,014, Friction Materials Made With Resins Containing Polar Functional Groups, Timothy P. Newcomb, Filed Sep. 10, 2008.

U.S. Appl. No. 10/678,720, Friction Material Containing Partially Carbonized Carbon Fibers, Robert C. Lam, Filed Oct. 3, 2003.

U.S. Appl. No. 12/400,904, Frictional Device Comprising At Least One Friction Plate, Eckart Gold, Filed Mar. 10, 2009.

U.S. Appl. No. 12/492,261, Friction Materials, Herschel L. McCord, Filed Jun. 26, 2009.

U.S. Appl. No. 10/898,882, Porous Friction Material With Nanoparticles of Friction Modifying Material, Robert C. Lam, Filed Jul. 26, 2004.

U.S. Appl. No. 10/678,598, Mixed Deposit Friction Material, Robert C. Lam, Filed Oct. 3, 2003.

U.S. Appl. No. 10/678,599, High Performance, Durable, Deposit Friction Material, Robert C. Lam, Filed Oct. 3, 2003.

U.S. Appl. No. 10/916,328, High Coefficient Woven Friction Material, Robert C. Lam, Filed Aug. 11, 2004.

* cited by examiner

POROUS FRICTION MATERIAL COMPRISING NANOPARTICLES OF FRICTION MODIFYING MATERIAL

CROSS REFERENCE TO RELATED APPLICATION

This application is a divisional of U.S. patent application Ser. No. 10/899,508, now U.S. Pat. No. 7,429,418, filed Jul. 26, 2004.

TECHNICAL FIELD

The present invention relates to a porous friction material comprising a porous base material and at least one type of nanoparticle-sized friction modifying particles. The friction material of the present invention has high coefficient of friction characteristics, very robust anti-shudder characteristics and extremely high heat resistance. The friction material also has improved strength, wear resistance and noise resistance.

BACKGROUND ART

New and advanced continuous torque transmission systems, having continuous slip torque converters and shifting clutch systems are being developed by the automotive industry. These new systems often involve high energy requirements. Therefore, the friction materials technology must be also developed to meet the increasing energy requirements of these advanced systems.

In particular, a new high performance, durable friction material is needed. The new friction material must be able to withstand high speeds wherein surface speeds are up to about 65 m/seconds. Also, the friction material must be able to withstand high facing lining pressures up to about 1500 psi. It is also important that the friction material be useful under limited lubrication conditions.

The friction material must be durable and have high heat resistance in order to be useful in the advanced systems. Not only must the friction material remain stable at high temperatures, it must also be able to rapidly dissipate the high heat that is being generated during operating conditions.

The high speeds generated during engagement and disengagement of the new systems mean that a friction material must be able to maintain a relatively constant friction throughout the engagement. It is important that the frictional engagement be relatively constant over a wide range of speeds and temperatures in order to minimize "shuddering" of materials during braking or the transmission system during power shift from one gear to another. It is also important that the friction material have a desired torque curve shape so that during frictional engagement the friction material is noise or "squawk" free.

In particular, transmission and torque-on-demand systems incorporate slipping clutches mainly for the fuel efficiency and driving comfort. The role of the slip clutch within these systems varies from vehicle launching devices, such as wet start clutches, to that of a torque converter clutches. According to the operating conditions, the slip clutch can be differentiated into three principle classes: (1) Low Pressure and High Slip Speed Clutch, such as wet start clutch; (2) High Pressure and Low Slip Speed Clutch, such as Converter Clutch; and (3) Extreme Low Pressure, and Low Slip Speed Clutch, such as neutral to idle clutch.

The principal performance concerns for all applications of the slip clutch are the prevention of shudder and the energy management of the friction interface. The occurrence of shudder can be attributed to many factors including the friction characteristics of the friction material, the mating surface's hardness and roughness, oil film retention, lubricant chemistry and interactions, clutch operating conditions, driveline assembly and hardware alignment, and driveline contamination. The friction interface energy management is primarily concerned with controlling interface temperature and is affected by the pump capacity, oil flow path and control strategy. The friction material surface design also contributes to the efficiency of interface energy management.

Previously, asbestos fibers were included in the friction material for temperature stability. Due to health and environmental problems, asbestos is no longer being used. More recent friction materials have attempted to overcome the absence of the asbestos in the friction material by modifying impregnating paper or fiber materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

The Kearsey U.S. Pat. No. 5,585,166 describes a multi layer friction lining having a porous substrate layer (cellulose and synthetic fibers, filler and thermoset resin) and a porous friction layer (nonwoven synthetic fibers in a thermoset resin) where the friction layer has a higher porosity than the substrate layer.

The Seiz U.S. Pat. No. 5,083,650 reference involves a multi-step impregnating and curing process; i.e., a paper impregnated with a coating composition, carbon particles are placed on the paper, the coating composition in the paper is partially cured, a second coating composition is applied to the partially cured paper, and finally, both coating compositions are cured.

Various paper based fibrous materials have been developed that are co-owned by the assignee herein, BorgWarner Inc., for use in friction materials. These references are fully incorporated herein by reference.

In particular, Lam et al., U.S. Pat. No. 5,998,307 relates to a friction material having a primary fibrous base material impregnated with a curable resin where the porous primary layer comprises at least one fibrous material and a secondary layer comprises carbon particles covering at least about 3 to about 90% of the surface of the primary layer.

The Lam et al., U.S. Pat. No. 5,858,883 relates to a base material having a primary layer of less fibrillated aramid fibers, synthetic graphite, and a filler, and a secondary layer comprising carbon particles on the surface of the primary layer.

The Lam et al., U.S. Pat. No. 5,856,224 relates to a friction material comprising a base impregnated with a curable resin. The primary layer comprises less fibrillated aramid fibers, synthetic graphite and filler; the secondary layer comprises carbon particles and a retention aid.

The Lam et al. U.S. Pat. No. 5,958,507 relates to a process for producing a friction material where about 3 to about 90% of at least one surface of the fibrous material which comprises less fibrillated aramid fibers is coated with carbon particles.

The Lam, U.S. Pat. No. 6,001,750 relates to a friction material comprising a fibrous base material impregnated with a curable resin. The porous primarily layer comprises less fibrillated aramid fibers, carbon particles, carbon fibers, filler material, phenolic novoloid fibers, and optionally, cotton fibers. The secondary layer comprises carbon particles which cover the surface at about 3 to about 90% of the surface.

Yet another commonly owned patent application Ser. No. 09/707,274 relates to a paper type friction material having a porous primary fibrous base layer with friction modifying particles covering about 3 to about 90% of the surface area of the primary layer.

In addition, various paper type fibrous base materials are described in commonly owned BorgWarner Inc. Lam et al., U.S. Pat. Nos. 5,753,356 and 5,707,905 which describe base materials comprising less fibrillated aramid fibers, synthetic graphite and filler, which references are also fully incorporated herein by reference.

Another commonly owned patent, the Lam, U.S. Pat. No. 6,130,176, relates to non-metallic paper type fibrous base materials comprising less fibrillated aramid fibers, carbon fibers, carbon particles and filler.

For all types of friction materials, in order to be useful in "wet" applications, the friction material must have a wide variety of acceptable characteristics. The friction material must have good anti-shudder characteristics; have high heat resistance and be able to dissipate heat quickly; and, have long lasting, stable and consistent frictional performance. If any of these characteristics are not met, optimum performance of the friction material is not achieved.

It is also important that a suitable impregnating resin be used in the friction material in order to form a high energy application friction material. The friction material must have good shear strength during use when the friction material is infused with brake fluid or transmission oil during use.

Accordingly, it is an object of the present invention to provide an improved friction material with reliable and improved properties compared to those of the prior art.

A further object of this invention is to provide a friction materials with improved "anti-shudder", "hot spot" resistance, high heat resistance, high friction stability and durability, and strength.

IN THE DRAWINGS

FIGS. 1b-1d are schematic diagrams showing relative sizes of particles: FIG. 1b—typical fiber diameter of 10-15 micrometers; FIG. 1c—typical average size of diatom particle of 10-20 micrometers; FIG. 1d nanoparticle size of 0.01 micrometers.

SUMMARY OF THE INVENTION

The present invention relates to a friction material that comprises a porous base material having at least one type of friction modifying particle in the base material where the friction modifying material comprises at least one type of nanoparticle-sized friction modifying particle.

The nanoparticle-sized friction modifying particle is added to the porous base material as the base material is being made. During the base material making process, the nanoparticle-sized friction modifying particles are deposited on individual fibers and/or fillers comprising the base material. The individual fibers and/or fillers comprising the friction material can have a layer, or partial coating, of the nanoparticle-sized friction modifying particles with a thickness of about 0 to about 250 μm on such individual fibers and/or fillers. The nanoparticle-sized friction modifying particles have an average diameter size from about 10 nm to about 150 nm. In certain embodiments, the nanoparticle layer, or partial coating, covers about 0 to about 99%, by area, of the individual fibers and/or fillers of the base material, an in other embodiments, the nanoparticles cover about 3 to about 20%, by area, of the individual fibers and/or fillers of the base material. Further, in certain embodiments, the nanoparticles at least partially cover individual fibers and/or filler of the base material.

In certain preferred embodiments, the friction modifying particles comprise silica nanoparticles. In certain other embodiments, the friction modifying particles can further comprise silica particles and at least one other nanoparticle sized friction modifying particle.

In one aspect, a friction material comprises a porous base material, at least one type of resin material, and at least one type of nanoparticle-sized friction modifying particle.

According to the present invention a layer, or partial coating, of nanoparticles is deposited on and in the fibrous friction base material. The nanoparticles penetrate into the interior structure and adhere on the fiber and/or filler ingredients of the base material.

While not wishing to be bound by theory, it is believed that the nanoparticles, when adhered to the fibers of the base material, provide additional mechanical strength and an increase in the friction characteristics to the friction material. The nanoparticles adhere to the surface of the fibers and/or fillers present in the base material due to their extremely small size and due to the relatively large surface area provided by the fibers/filler themselves in comparison to the nanoparticles. The extremely small size of the nanoparticles, in comparison to the fibers/fillers in the base material, allows the nanoparticle sized friction modifying material to be substantially evenly distributed throughout the base material.

One advantage of the adding the nanoparticles into the base material, and thus deposited on the surface of the individual fibers and/or fillers comprising the base material, is that friction performance is enhanced (e.g. higher coefficients of friction; better mu-v slope, and the like).

In certain embodiments the nanoparticles have a diameter size that ranges from about 10 nm to 150 nm. Also, in certain embodiments, the nanoparticles form clusters of nanoparticles which are deposited in groups or clumps on the individual fibers and/or fillers comprising the base material.

According to another aspect of the present invention, the nanoparticle friction modifying particles allow for the formation of an open, or substantially porous, base material that has a desired high permeability while maintaining the other desirable characteristics of high performance friction materials. The higher permeability of such base material containing such nanoparticle-sized friction modifying particles still allows the friction material to retain a desired amount of fluid within the friction material while providing the friction material with desired flow and anti-shudder characteristics.

In certain embodiments, the present invention relates to a friction material having a porous or lofty and open base material. The friction material has a desired low density and has a fiber architecture which allows a resin material to soak into the friction material. The friction material has extremely good heat resistance and coefficient of friction characteristics which allows the friction material to respond well under thermal and mechanical stresses.

In another aspect, the present invention relates to a "macro porous" fibrous base material (such as, for example a woven base material. The large pores in the porous base material allow the nanoparticle-sized friction modifying materials to settle into the voids or interstices in the porous base material.

In the macro-porous friction material of the present invention, the large pores allow contaminants in the fluid to pass through readily the friction material. As is known to those skilled in the art, lubrications deteriorate over time and debris is generated. The friction material of the present invention keeps the friction behavior of the friction material constant throughout the useful life of friction material.

In one aspect of the present invention, the base material average voids volume from about 40% to about 85%. In certain embodiments, the porous base material comprises from about 70-85%, by weight, fibers and from about 10-30%, by wt. fillers. In certain embodiments, the porous base material can comprise about 80% fiber and about 20% filler.

In certain embodiments, the base material has an average pore/void/interstice diameter of about 2 to about 10 µm, and having an average diameter of about 5 to about 7 µm.

Further, in certain embodiments, the friction modifying particles comprise nanoparticles of silica. In other embodiments, the nanoparticles can be combination of silica and other friction modifying particles.

Still further, in certain embodiments, the friction modifying particles comprise a mixture of nanoparticle-sized material and larger sized friction modifying particles.

The nanoparticles of friction modifying particles in the base material provides an improved three-dimensional structure to the resulting friction material.

In another aspect, the invention relates to a method for producing friction material where a porous base material is saturated with a saturant. The saturant can include at least one resin material, and at least one type of nanoparticle-sized friction modifying particles, such that a plurality of the nanoparticle-sized friction modifying particles form a layer, or partial coating, on the individual fibers and/or fillers comprising the base material. The saturated base material is cured at a predetermined temperature for a predetermined period of time.

In another aspect, the method includes producing a friction material by preparing a saturant material comprising a mixture of at least one curable resin material and at least one type of nanoparticle sized friction modifying particle, preparing a porous base material having a plurality of interstices dispersed therethrough, and saturating the porous base material with the saturant material whereby a plurality of the nanoparticle sized friction modifying particles are at least partially deposited on individual fibers comprising the base material and whereby the resin material is substantially evenly dispersed throughout the base material

DETAILED DESCRIPTION OF INVENTION

In order to achieve the requirements discussed above, many friction materials were evaluated for friction and heat resistant characteristics under conditions similar to those encountered during operation. Commercially available friction materials were investigated and proved not to be suitable for use in high energy applications.

According to the present invention, a friction material has a uniform dispersion of the curable resin throughout a porous base material and a substantially uniform amount of nanoparticle sized friction modifying materials dispersed throughout the porous base material.

In one aspect, the base material comprises a highly porous material such as a long fiber woven material, and in other aspects, comprises a highly porous nonwoven material. In certain embodiments, the porous base material has a high fiber content in the range of about 75 to about 85%, and in certain embodiments, about 80%, by weight, based on the weight of the base material. The base material also has a filler content in the range of about 15 to about 25%, by weight, and in certain embodiments about 20%, based on the weight of the base material. Less filler in the base material significantly increases the lateral permeability.

In still other embodiments, the nanoparticle sized friction modifying particles can also include other friction modifying particles such as metal oxides, nitrides, carbides, and mixtures thereof. It is within the contemplated scope of the present invention that these embodiments can include, for example, silica oxides, iron oxides, aluminum oxides, titanium oxides and the like; silica nitrides, iron nitrides, aluminum nitrides, titanium nitrides and the like; and, silica carbides, iron carbides, aluminum carbides, titanium carbides and the like.

Various base materials are useful in the friction material of the present invention, including, for example, non-asbestos fibrous base materials comprising, for example, fabric materials, woven and/or nonwoven materials. Suitable fibrous base materials include, for example, fibers and fillers. The fibers can be organic fibers, inorganic fibers and carbon fibers. The organic fibers can be aramid fibers, such as fibrillated and/or nonfibrillated aramid fibers, acrylic fibers, polyester fibers, nylon fibers, polyamide fibers, cotton/cellulose fibers and the like. The fillers can be, for example, silica, diatomaceous earth, graphite, alumina, cashew dust and the like.

In other embodiments, the base material can comprise fibrous woven materials, fibrous non-woven materials, and paper materials. Further, examples of the various types of fibrous base materials useful in the present invention are disclosed in the above-referenced BorgWarner U.S. patents which are fully incorporated herein by reference. It should be understood however, that other embodiments of the present invention can include yet different fibrous base materials.

In certain embodiments, the friction material comprises a base material which has a plurality of voids or interstices therein. The size of the voids in the fibrous base material can range from about 0.5 µm to about 20 µm.

In certain embodiments, the base material preferably has a void volume of about 60 to about 85% such that the fibrous base material is considered "porous" as compared to a "dense" woven material. The friction material has substantially the same permeability in the radial direction and in the normal direction.

In one aspect of the present invention relates to a friction material having a novel microstructured surface. The microstructured surface friction material has a higher coefficient of friction, even more robust anti-shudder characteristics, and extremely high heat resistance.

In one aspect the present invention relates to a friction material having a porous or lofty and open base material. The material has a low density and has a fiber architecture which allows a resin material to soak into the base material. The friction material has extremely good heat resistance and coefficient of friction characteristics which allows the friction material to respond well under thermal and mechanical stresses.

In another aspect, the "macro porous" fibrous material has a surface which is partially uncovered by the friction modifying materials. The large pores allow the nanoparticle sized friction modifying materials to settle into the voids or interstices in the base material. In the macro porous friction material of the present invention, the large pores allow contaminants in the fluid to pass through readily. As lubrications deteriorate over time, debris is generated. The friction material of the present invention keeps the friction behavior of the friction material constant.

In certain embodiments, friction material further comprises a resin material which at least partially fills the voids in the fibrous base material. The resin material is substantially uniformly dispersed throughout the thickness of the base material.

In certain embodiments, the base material comprises a fibrous base material where less fibrillated fibers and carbon fibers are used in the fibrous base material to provide a desirable pore structure to the friction material. The fiber geometry not only provides increased thermal resistance, but also provides delamination resistance and squeal or noise resistance. Also, in certain embodiments, the presence of the carbon fibers and carbon particles aids in the fibrous base material in increasing the thermal resistance, maintaining a steady coefficient of friction and increasing the squeal resistance. In certain embodiments, cotton fibers in the fibrous base material can be included to improve the friction material's clutch "break-in" characteristics.

The use of less fibrillated aramid fibers and carbon fibers in a fibrous base material improves the friction material's ability to withstand high temperatures. Less fibrillated aramid fibers generally have few fibrils attached to a core fiber. The use of the less fibrillated aramid fibers provides a friction material having a more porous structure; i.e., there are larger pores than if a typical fibrillated aramid fiber is used. The porous structure is generally defined by the pore size and liquid permeability.

Also, in certain embodiments, it is desired that the aramid fibers have a length ranging from about 0.5 to about 10 mm and a Canadian Standard Freeness (CSF) of greater than about 300. In certain embodiments, it is also desired to use less fibrillated aramid fibers which have a CSF of about 450 to about 550 preferably about 530 and greater; and, in other certain embodiments, about 580-650 and above and preferably about 650 and above. In contrast, more fibrillated fibers, such as aramid pulp, have a freeness of about 285-290.

The "Canadian Standard Freeness" (T227 om-85) means that the degree of fibrillation of fibers can be described as the measurement of freeness of the fibers. The CSF test is an empirical procedure which gives an arbitrary measure of the rate at which a suspension of three grams of fibers in one liter of water may be drained. Therefore, the less fibrillated aramid fibers have higher freeness or higher rate of drainage of fluid from the friction material than more fibrillated aramid fibers or pulp. Friction materials comprising the aramid fibers having a CSF ranging from about 430-650 (and in certain embodiments preferably about 580-640, or preferably about 620-640), provide superior friction performance and have better material properties than friction materials containing conventionally more fibrillated aramid fibers. The longer fiber length, together with the high Canadian freeness, provide a friction material with high strength, high porosity and good wear resistance. The less fibrillated aramid fibers (CSF about 530-about 650) have especially good long-term durability and stable coefficients of friction.

Various fillers are also useful in the fibrous base material of the present invention. In particular, silica fillers, such as diatomaceous earth, are useful. However, it is contemplated that other types of fillers are suitable for use in the present invention and that the choice of filler depends on the particular requirements of the friction material.

In certain embodiments, cotton fiber is added to the fibrous base material of the present invention to give the fibrous material higher coefficients of friction. In certain embodiments, about 10 to about 20%, and, in certain embodiments, about 10% cotton can also be added to the fibrous base material.

One example of a formulation for the fibrous base material comprises from about 15 to about 25% cotton, about 40 to about 50% aramid fibers, about 10 to about 20% carbon fibers, about 5 to about 15% carbon particles, about 5 to about 15% celite, and, optionally about 1 to about 3% latex add-on.

When the fibrous base material has a higher mean pore diameter and fluid permeability, the friction material is more likely to run cooler or with less heat generated in a transmission due to better automatic transmission fluid flow throughout the porous structure of the friction material. During operation of a transmission system, the fluid tends, over time, to breakdown and form "oil deposits", especially at high temperatures. These "oil deposits" decrease the pore openings. Therefore, when the friction material initially starts with larger pores, there are more open pores remaining during the useful life of the friction material.

The friction modifying particles in the fibrous base material provides an improved three-dimensional structure to the resulting friction material.

The friction modifying material holds the fluid lubricant in the base material and increases the oil retaining capacity of the friction material. The friction material of the present invention thus allows an oil film to remain on its surface. This also provides good coefficient of friction characteristics and good slip durability characteristics.

The amount of nanoparticle-sized friction modifying particles in the fibrous base material is sufficiently random such that the nanoparticle-sized friction modifying particles deposited on the individual fibers and/or fillers of the base material provides the base material with a three-dimensional structure. This three-dimensional structure is comprised of individual particles of the friction modifying material on the individual fibers and/or fillers and in the voids or interstices between the individual fibers of the base material.

The uniformity of the deposited nanoparticle sized friction modifying particles in the base material is achieved by using a size of the friction modifying particles that can range from about 10 to about 150 nm in diameter as the primary particle size, and preferably about 10 to about 50 nm. In certain embodiments, the particles have an average nanoparticle diameter of about 15 nm to about 30 nm as the primary nanoparticle size.

Various types of nanoparticle-sized friction modifying particles are useful in the friction material. In one embodiment, useful friction modifying particles include silica particles. Other embodiments can have nanoparticle sized friction modifying particles such as resin powders such as phenolic resins, silicone resins epoxy resins and mixtures thereof. Still other embodiments can include partial and/or fully carbonized nanoparticle sized carbon powders and/or particles and mixtures thereof; and mixtures of such nanoparticle sized friction modifying particles. In certain embodiments, nanoparticle sized silica particles such as diatomaceous earth, Celite®, Celatom®, and/or silicon dioxide are especially useful. The nanoparticle sized silica particles are inorganic materials which bond strongly to the base material. The nanoparticle sized silica particles provide high coefficients of friction to the friction material. The nanoparticle sized silica particles also provide the base material with a smooth friction surface and provides a good "shift feel" and friction characteristics to the friction material such that any "shudder" is minimized.

In certain embodiments, the friction material can be impregnated using different resin systems. In certain embodiments, it is useful to use at least one phenolic resin, at least one modified phenolic-based resin, at least one silicone resin, at least one modified silicone resin, at least one epoxy resin, at least one modified epoxy resin, and/or combinations of the above In certain other embodiments, a silicone resin blended or mixed with a phenolic resin in compatible solvents is useful.

Various resins are useful in the present invention. In certain embodiments, the resin can comprise phenolic or phenolic based resins, preferably so that the saturant material comprises about 45 to about 65 parts, by weight, per 100 parts, by weight, of the friction material. After the resin mixture has been applied to the base material and the base material has been impregnated with the resin mixture, the impregnated base material is heated to a desired temperature for a predetermined length of time to form a friction material. In certain embodiments, the heating cures the phenolic resin present in the saturant at a temperature of about 300° F. When other resins are present in the saturant, such as a silicone resin, the heating cures the silicone resin at a temperature of about 400° F. Thereafter, the cured friction material is adhered to a desired substrate by suitable means.

Various useful resins include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the mixture includes resin blend containing about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Examples of useful phenolic and phenolic-silicone resins useful in the present invention are fully disclosed in the above-referenced BorgWarner U.S. patents which are fully incorporated herein, by reference. Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm, Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin, comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

In certain embodiments, it is preferred that resin mixture comprises desired amounts of the resin and the nanoparticle sized friction modifying particles such that the target pick up of resin by the base material ranges from about 25 to about 70%, in other embodiments, from about 40 to about 65%, and, in certain embodiments, about 60 to at least 65%, by weight, total silicone-phenolic resin. After the base material is saturated with the resin, the base material is cured for a period of time (in certain embodiments for about ½ hour) at temperatures ranging between 300-400° C. to cure the resin binder and form the friction material. The final thickness of the friction material depends on the initial thickness of the base material.

It further contemplated that other ingredients and processing aids known to be useful in both preparing resin blends and in preparing base materials can be included, and are within the contemplated scope of the present invention.

In certain embodiments, the resin mixture can comprise both the silicone resin and the phenolic resin which are present in solvents which are compatible to each other. These resins are mixed together (in preferred embodiments) to form a homogeneous blend and then used to saturate the fibrous base material. In certain embodiments, there is not the same effect if the base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good saturation of the base material.

In certain embodiments of the present invention, the base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methyl-ethyl ketone, butanol, isopropanol, toluene and the like, can be utilized in the practice of this invention. The presence of a silicone resin, when blended with a phenolic resin and used to saturate the base material, causes the resulting friction materials to be more elastic than base materials impregnated only with a phenolic resin. When pressures are applied to the silicone-phenolic resin blended impregnated friction material of the present invention, there is a more even distribution of pressure which, in turn, reduces the likelihood of uneven lining wear. After the silicone resin and phenolic resin are mixed together with the friction modifying particles, the mixture is used to impregnate the base material.

The friction material of the present invention includes nanoparticle sized friction modifying particles randomly dispersed within a base material provides a friction material with good anti-shudder characteristics, high resistance, high coefficient of friction, high durability, good wear resistance and improved break-in characteristics.

Figure 1A:
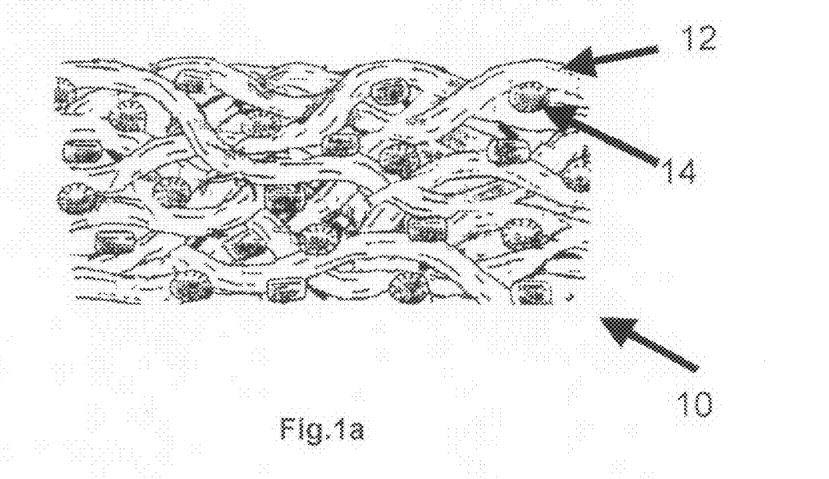
FIG. 1a is a schematic diagram showing a prior art friction material having a fibrous base and friction modifying particle.
Figure 1B:
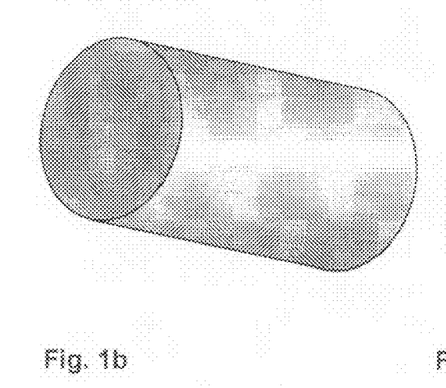
Figures 1C, 1D:
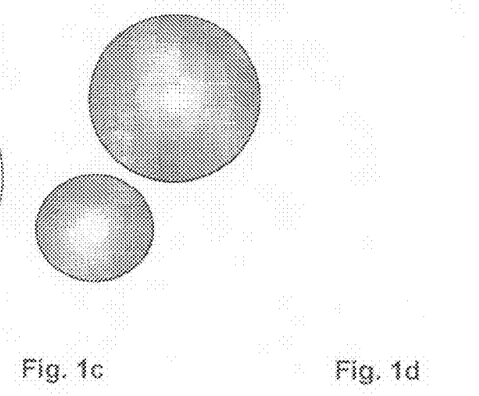
Figure 2:
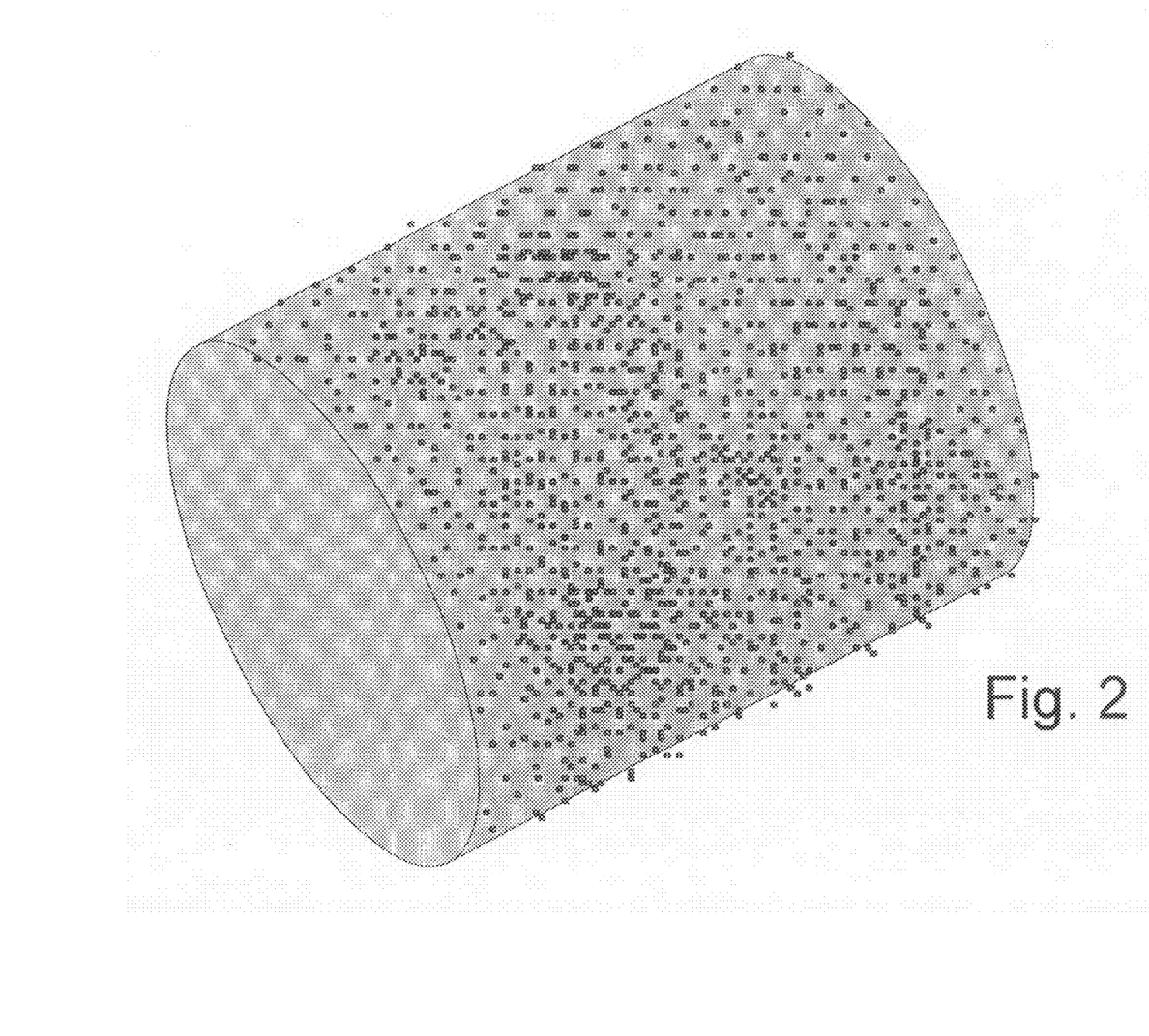
FIG. 2 is a schematic illustration showing a layer, or partial coating, of nanoparticle-sized friction modifying particles on a fiber (generally to scale).
Figure 3:
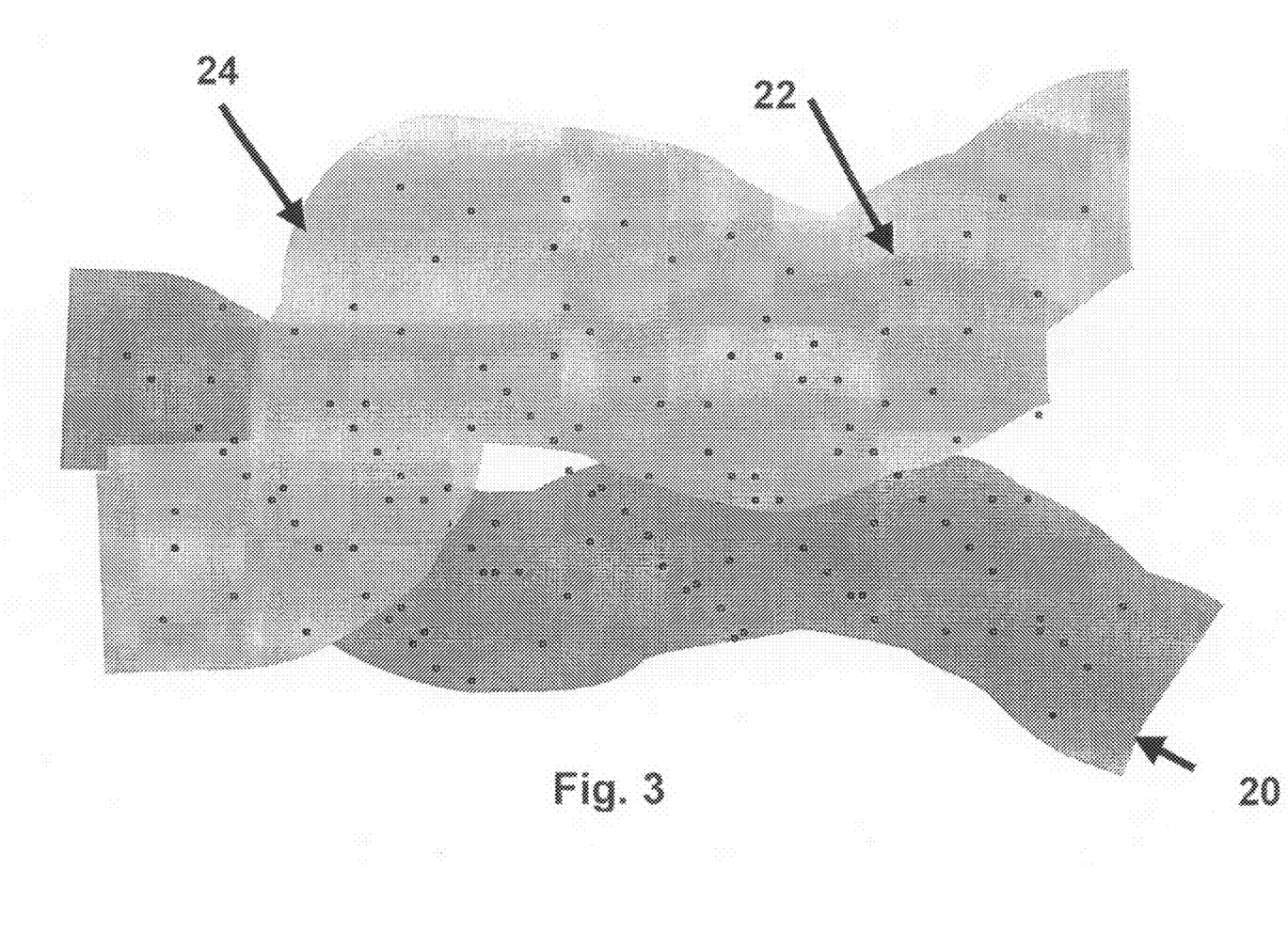
FIG. 3 is a schematic illustration showing nanoparticle-sized friction materials on fibers in a base material (generally to scale).

FIG. 1a is a schematic diagram showing a prior art friction material 10 having a fibrous base material 12 and diatom friction modifying particles 14. The FIGS. 1b, 1c and 1d are schematic illustrations showing a comparison between the sizes of the fibers (FIG. 1b), the conventional silica particles (FIG. 1c), and the nanoparticles used in the present invention (FIG. 1d). FIG. 2 is a schematic illustration of a fiber having nanoparticles on the surface of the fiber. FIG. 3 is a schematic illustration showing a fibrous base material 20 showing nanoparticle-sized friction 24 materials on fibers 22.

In certain embodiments, it has been discovered that when the friction modifying particle size is extremely small, a desired optimum three-dimensional structure is achieved and, consequently, the heat dissipation and antishudder characteristics of the resulting friction material are optimized.

In certain embodiments, it is believed that the nanoparticles of friction modifying materials form clusters, or aggregates, of nanoparticles on the individual fibers and the fillers that form an outer surface of the base material. In certain embodiments, the clusters have an average diameter of less than about 30 to 100 nm.

The nanoparticles sized friction modifying materials used in the porous friction material of the present invention provides the friction material with good anti-shudder characteristics. In the embodiment shown, the high temperature synthetic fibers and porosity of the base material provides improved heat resistance.

In addition, the porous friction material has relatively large pores which allow contaminants of fluids to pass through readily. This absorption of such degradation products provides the friction material with even more constant friction behaviors.

The following examples provide further evidence that the random dispersion of nanoparticles sized friction modifying particles within the friction material of the present invention provides an improvement over conventional friction materials. The friction materials have desirable coefficient of friction, heat resistance and durability characteristics. Various preferred embodiments of the invention are described in the following examples, which however, are not intended to limit the scope of the invention.

EXAMPLES

Example I

A comparison of slope v. slipping time in grooved materials . . . which shows that the material allows the oil flow to be within the desired conditions and allows for good dissipation of heat.

Example II

The deposit of the nanoparticles sized friction modifying particle within the base material does not significantly reduce permeability of the base material. The permeability of the base material allows the fluid or lubricant to flow into the base material and not remain held at the surface of the friction material.

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limiting upon the scope and content of the following claims.

We claim:

1. A method for producing a frictional material comprising:
    providing a porous base material comprising fibers and fillers, the fibers comprising less fibrillated aramid fibers and carbon fibers, and wherein the fibers constitute about 70 to about 85 weight percent of the porous base material;
    saturating the porous base material with a saturant comprising at least one resin material and nanoparticle-sized friction modifying particles such that a plurality of the nanoparticle-sized friction modifying particles are deposited on the fibers and fillers of the porous base material to an average thickness of up to about 200 μm, the nanoparticle-sized friction modifying particles having an average diameter size from about 10 nm to about 150 nm; and
    curing the saturant at a predetermined temperature for a predetermined period of time.

2. The method of claim 1 wherein the less fibrillated aramid fibers have a length ranging from about 0.5 mm to about 10 mm and a Canadian Standard Freeness of greater than about 300.

3. The method of claim 1 wherein the fibers further comprise cotton fibers.

4. The method of claim 1 wherein the nanoparticle-sized friction modifying particles comprise at least one of a silica oxide, an iron oxide, an aluminum oxide, a titanium oxide, a silica nitride, an iron nitride, an aluminum nitride, a titanium nitride, or a combination thereof.

5. The method of claim 1 wherein the resin material comprises at least one of a phenolic resin, a modified phenolic-based resin, a silicone resin, a modified silicon-based resin, an epoxy resin, or combinations thereof.

6. The method of claim 1 wherein the resin material comprises a silicon resin and a phenolic resin mixed together in compatible solvents.

7. A method for producing a friction material comprising:
    preparing a saturant material comprising a mixture of at least one curable resin material and nanoparticle-sized friction modifying particles, the curable resin material comprising a silicon resin and a phenolic resin mixed together in compatible solvents, the nanoparticle-sized friction modifying particles having an average diameter size from about 10 nm to about 150 nm;
    preparing a porous base material comprising fibers and having a plurality of interstices dispersed therethrough; and
    saturating the porous base material with the saturant material whereby a plurality of the nanoparticle-sized friction modifying particles are deposited on the fibers of the porous base material and whereby the resin material and the nanoparticle-sized friction modifying particles are substantially evenly dispersed throughout the porous base material.

8. The method of claim 7 wherein the fibers of the porous base material comprise less fibrillated aramid fibers having a length ranging from about 0.5 mm to about 10 mm and a Canadian Standard Freeness of greater than about 300.

9. The method of claim 8 wherein the fibers of the porous base material further comprise carbon fibers and cotton fibers.

10. The method of claim 7 wherein the porous base material further comprises fillers, and wherein the fibers of the porous base material constitute about 75 to about 85 weight percent of the porous base material.

11. The method of claim 7 wherein the nanoparticle-sized friction modifying particles comprise at least one of a silica oxide, an iron oxide, an aluminum oxide, a titanium oxide, a silica nitride, an iron nitride, an aluminum nitride, a titanium nitride, or combinations thereof.

12. The method of claim 7 wherein the curable resin material comprises about 5 to about 80 percent silicon resin based on the weight of the phenolic and silicon resins.

13. The method of claim 12 wherein the curable resin material comprises about 15 to about 55 percent silicon resin based on the weight of the phenolic and silicon resins.

14. The method of claim 12 wherein the curable resin material comprises about 15 to about 25 percent silicon resin based on the weight of the phenolic and silicon resins.

* * * * *